SAMUEL C. CALDWELL &
LAWRENCE R. PEASLEE
*INVENTORS*

BY
*Robert R Strack*
THEIR ATTORNEY

Nov. 29, 1966   S. C. CALDWELL ETAL   3,289,070
CIRCUITRY FOR OBVIATING THE EFFECTS CAUSED BY SUBTRANSIENT
IMPEDANCES IN SCR GENERATING SYSTEM
Filed April 5, 1963   2 Sheets-Sheet 2

SAMUEL C. CALDWELL
& LAWRENCE R. PEASLEE
*INVENTORS*

BY *Robert P Strach*

THEIR ATTORNEY

United States Patent Office 3,289,070
Patented Nov. 29, 1966

3,289,070
CIRCUITRY FOR OBVIATING THE EFFECTS CAUSED BY SUBTRANSIENT IMPEDANCES IN SCR GENERATING SYSTEM
Samuel C. Caldwell, Chagrin Falls, Ohio, and Lawrence R. Peaslee, Waynesboro, Va., assignors to General Electric Company, a corporation of New York
Filed Apr. 5, 1963, Ser. No. 274,373
7 Claims. (Cl. 321—69)

This invention relates to generating systems, and more particularly, it relates to means for improving the output waveform from an alternating current generator.

The expanding field of power generating systems to provide increasing amounts of power handling capacity, wider frequency ranges, and greater purity of waveform has created a number of problems never before faced. One of these problems arises in the general field of generator voltage regulation. The problem is how to produce a voltage waveform that corresponds to that of the voltage generated by the air gap flux.

It has long been apparent that the voltage available at the output of a generator is not identical to that generated by the air gap flux. Many mechanical and electrical factors contribute to the losses which destroy the possibility of correspondence. In general, prior generating systems have been adequate when they were able to provide an output that would appropriately operate succeeding equipment; however, present day apparatus places restrictions upon wave shape of sufficient criticality that extreme means are required for insuring the generation of specific waveforms.

For example, in variable speed constant frequency systems such as disclosed in the co-pending patent application Serial No. 129,646, now Patent No. 3,152,297, filed August 7, 1961, by L. R. Peaslee, and assigned to the General Electric Company, assignee of the present invention, circuitry is employed which requires for optimum performance, a sinusoid of considerable purity. As fully described in the cited patent application, the power delivered to a load by a three-phase generator is controlled by the selective switching of a plurality of controlled rectifiers. The instant of firing of the various controlled rectifiers is controlled by a triggering signal which includes, among other components, the waveform of the generator. A highly stable frequency signal source in combination with the generator output is selectively controlled to produce impulses for triggering the appropriate controlled rectifiers at an appropriate time within each cycle. Any distortion of the generator output waveform disturbs the instant of firing time and depending upon the extent of this disturbance, affects the operating efficiency of the entire system.

To understand the way in which this basic output signal can be distorted, one need merely consider the effects of firing a controlled rectifier which is placed directly across the output terminals of a generator. Clearly, at the instant of firing, a substantial short circuit is applied across the generator terminals. The extreme rapidity with which controlled rectifiers can be switched has introduced a problem not heretofore experienced because the ability to create transient changes within a time period of microseconds was not heretofore present.

An object of the present invention is to provide means for reconstructing the voltage generated by the air gap flux in a generator.

From another aspect, an object of the present invention is to obtain a sinusoidal output from a generator by means including reconstruction of the voltage generated by the air gap flux therein.

The present invention is directed toward reconstructing the voltage behind the generator subtransient impedance by developing a voltage that is instantaneously equal to the voltage drop caused by the internal impedance of the generator. In order to fully express the internal impedance of a generator that provides a varying frequency alternating current output, it is necessary to recognize the variations in impedance throughout the frequency range. Normally, the internal generator impedance is considered to be that which the generator presents under steady state conditions. In the event of a change in load conditions which takes place over a period of time equivalent to several cycles of output voltage only, an internal impedance is presented which is not the same as the steady state impedance. In order to differentiate this impedance it may be designated the "transient impedance." The reason for the variation in the actual impedance values is obvious to those familiar with alternating current circuitry and components, because the complex nature of a generator from the standpoint of the impedances present therein will obviously result in a complex impedance pattern. In the operation of systems such as those in the above cited application, wherein load changes within periods in the order of microseconds are frequent occurrences, still another characteristic of the internal generator impedance becomes apparent. This may be called the "subtransient impedance" and is that internal generator impedance presented under the influence of frequency changes of shorter magnitude than a cycle of generator output. Inasmuch as the generator output depends directly upon the effect of its internal impedance upon the load delivered, in order to provide a prescribed output the varying characteristics of the internal generator impedance must be taken into account.

Another object of the present invention is to establish a generator output that has been compensated for the voltage dropping effects of the internal subtransient impedance.

In accordance with an illustrative embodiment of the invention, means are provided for sensing the current delivered to a load and for developing in response thereto, a voltage equivalent to the voltage losses in the generator resulting from its subtransient impedance. The voltage so created is thereupon serially connected with the generated output voltage in order to reconstruct the original voltage generated by the air gap flux within the generator.

The novel features of the invention are set forth with particularity in the appended claims. The invention itself, however, both as to its organization and method of operation, together with further objects and features thereof, may best be understood by reference to the following description taken in conjunction with the accompanying drawings wherein:

In order to more clearly illustrate the invention and avoid obfuscation by detailed description of the circuitry with which it may cooperate, it has been shown in cooperation with a frequency converter system such as disclosed in the co-pending patent application Serial No. 129,646, cited above. Reference may be made to this patent application for a complete description of the operation of the system and the parts that are common therewith. Where components of the present disclosure in FIGURE 1 correspond to similar components in the cited patent application, identical numerical designations have been employed. These designations are distinguished in FIGURE 1 by underlining the numerals associated therewith.

Figure 1:
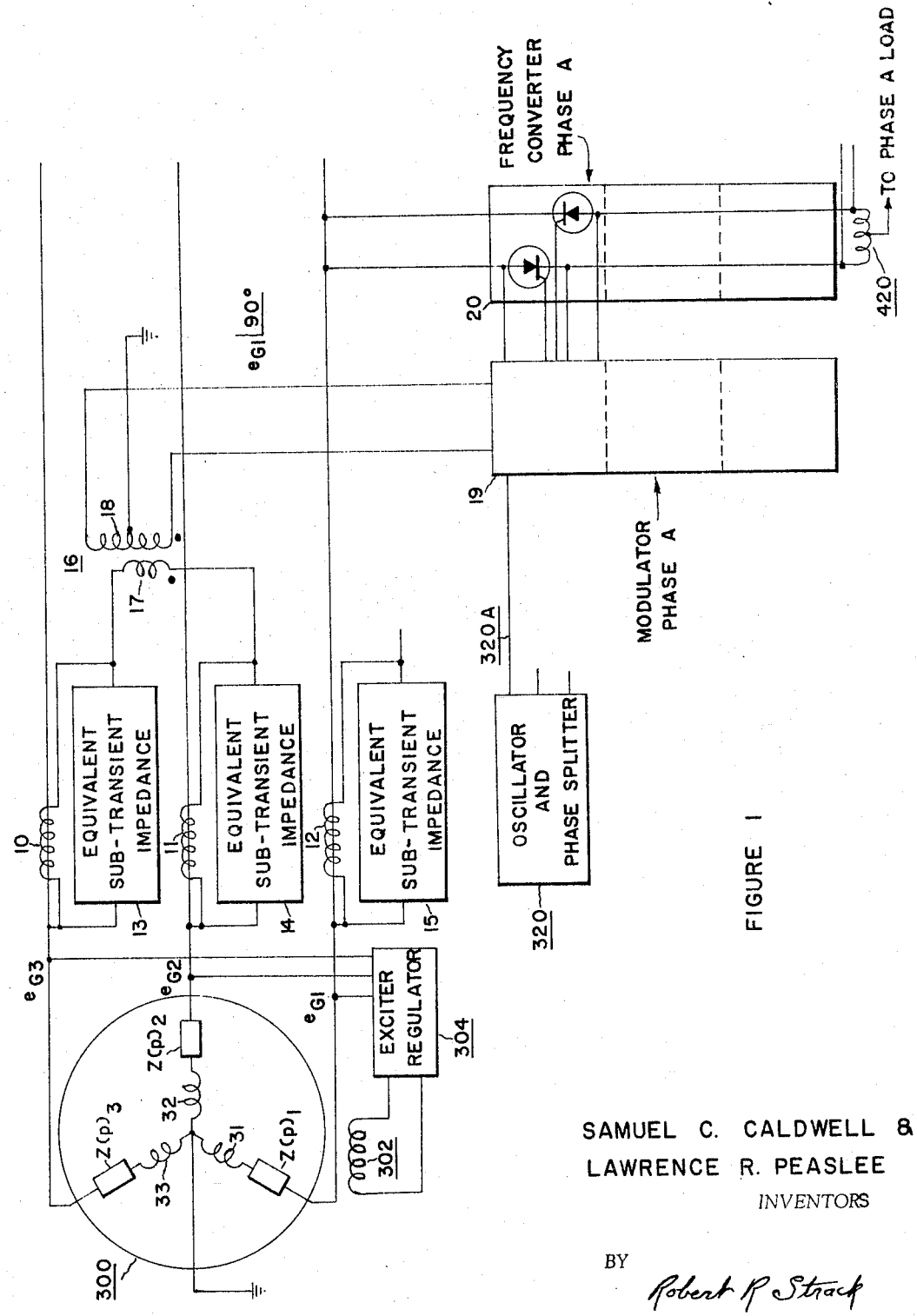
FIGURE 1 is a circuit schematic illustrating the incooperation of the invention into a three-phase generating system.

FIGURE 1 illustrates the basic units of a three-phase variable speed constant frequency system a three-phase generator 300 supplies power over three conductors, which is selectively operated upon by a plurality of frequency converters, before application to a load. Each phase of the load has an independent frequency converter. One such frequency converter is shown as the frequency converter for phase A, 20, appearing in the lower righthand portion of the figure. In essence, these frequency converters comprise a plurality of controlled rectifiers which are suitably triggered into conduction at appropriate times under the control of a modulator. An illustrative pair of controlled rectifiers, associated with the first phase of the generator 300, is shown. Two further pairs are employed for the second and third phases. The modulator for phase A has been depicted at 19. In accordance with the embodiment shown in the above cited patent application, the modulator is controlled to generate triggering signals in accordance with the combined effect of the generator output voltage and a reference voltage from a stable frequency oscillator 320.

The details of the circuitry associated with the phase A modulator 19 and the frequency converter 20 are not germane to the invention and may be gleaned from the cited patent application. An understanding of the importance of wave shape purity may be obtained, however, by considering the combined effect of the stable reference oscillator output and the generator output to establish a triggering impulse for the frequency converter. For this purpose, the wave shapes of FIGURE 2 have been presented.

Figure 2:
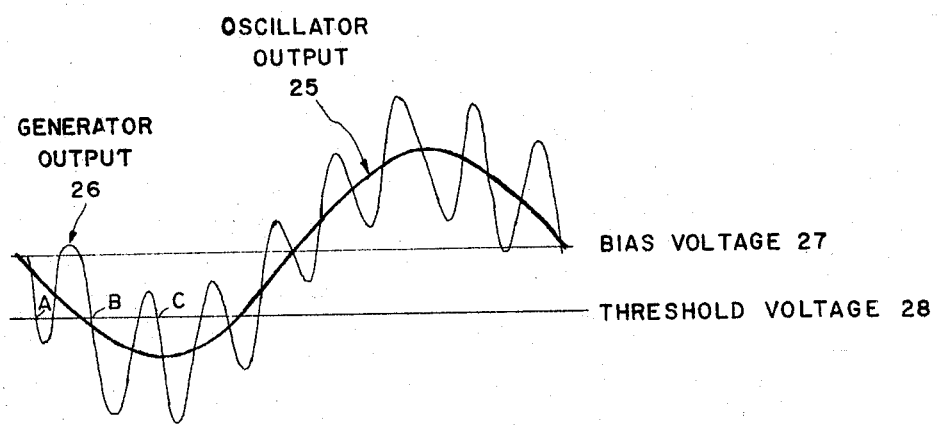
FIGURE 2 is a waveform showing the effect of generator output voltage upon the triggering threshold of controlled rectifiers in a system such as disclosed herein.

FIGURE 2 illustrates a basic sinusoidal wave 25 representing the phase A output of an oscillator 320. Superimposed upon this basic wave shape is the higher frequency output 26 of one phase of the generator 300. The modulator circuit 19 is essentially a triggering circuit which is operative in response to a particular voltage level. Thus, when the combined voltage attains this particular level, a triggering impulse is applied to the appropriate controlled rectifiers in frequency converter 20 which in turn connect power via winding 420 to one phase of the load. The instant at which this predetermined voltage is attained is extremely critical inasmuch as it determines both the power applied and the waveform of the output power. Any distortion or irregularity in the combined waveform will be effective to adversely affect the precise timing required.

In FIGURE 2 a threshold voltage 28 has been depicted as the voltage level which is effective to cause modulator 19 to generate a triggering impulse for the appropriate controlled rectifiers in frequency converter 20. It will be noted that a bias voltage level 27 is used to raise or lower the combined voltage away from or closer to, this threshold voltage level and thereby affect the instant of time at which triggering is initiated. Examination of the waveform in FIGURE 2 will show that the threshold voltage is first reached at point A. Modulator 19 in response to this condition operates to generate triggering impulses for its associated controlled rectifiers. Subsequently, it points B and C, additional triggering impulses are generated.

Figure 3:
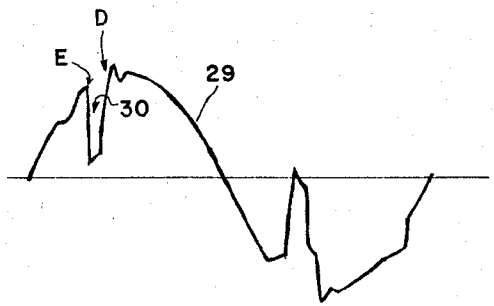
FIGURE 3 is a waveform illustrating the effect of commutation nicks upon a generator output.

FIGURE 3 illustrates a typical waveform 29 for one cycle of generator output. The distortion presented in this waveform, notably the commutation nick 30, is illustrated in order to graphically portray the possible effects upon the instant of triggering such distortion may have. Obviously, if the equipment is operating in such a mode that triggering should normally occur at point E in FIGURE 3, the commutation nick will make this triggering ineffective. In such a case, triggering would not occur until a later time at point D. It is imperative that the system disturbance created by such inaccurate triggering be avoided and consequently, the present invention has been developed to provide a substantially pure sinusoidal signal for combination with the oscillator output 25 in order to guarantee accurate timing of the triggering networks.

Although, of course, well shaped signals may be developed by means of filtering networks, they may have many disadvantages. A well designed filter capable of filtering the deep notches in the generator terminal wave shapes and also the lower frequency distortions at one generator frequency is unsatisfactory at another frequency because the fundamental frequency will shift in phase. In a variable speed constant frequency generating system, for example, the generator frequency varies over a wide range and, therefore, a filtering approach is impractical. Furthermore, such a filter would have a poor transient response that would produce intolerable results.

In view of these factors, the present invention takes advantage of the fact that the voltage generated by the air gap flux in an alternator has a good enough waveform to permit its use, if it can be obtained without the intervening distortion presented before it arrived at the generator output terminals. Accordingly, the technique of the present invention is to reconstruct this voltage. Specifically, as shown by the symbolic representation of the generator 300 appearing at the upper left portion of FIGURE 1, this technique involves consideration of the alternator as comprising a voltage generated in phase windings 31, 32, and 33, connected in series with internal generator subtransient impedances $Z(p)_1$, $Z(p)_2$ and $Z(p)_3$, respectively; where "$p$" is the Heavyside transform symbol. Of course, the impedances Z are nonlinear.

By recreating the voltage lost across these internal impedances on an instantaneous basis, and reintroducing it to the distorted wave appearing at the output terminals, the originally pure wave is reconstructed. Heretofore, such extreme subtransient conditions were seldom imposed upon generators, and when they were, the resulting commutation nicks were unimportant. Consequently, the instantaneously varying internal impedance of a generator had never been contemplated with respect to eliminating its effects. In order to obtain an exact understanding of what this instantaneous internal impedance is, it is necessary to consider the varying amounts of impedance presented in response to the varying frequencies which will be required of the generator throughout its full spectrum of operation. Once this has been accomplished, an equivalent impedance circuit may be constructed.

The development of an equivalent subtransient impedance and its utilization to reconstruct the original voltage generated by the air gap flux may be understood by consideration of the following mathematical analysis with respect to a typical phase wherein the following symbols are employed:

$i$ = generator load current
$i_s$ = current in the secondary of a current transformer
$v$ = internal voltage generated by air gap flux of an alternator
$v_s$ = voltage across equivalent subtransient impedance
$v_o$ = reconstructed voltage
$V_t$ = generator terminal voltage
$Z(p)$ = the effective generator internal impedance
$z(p)$ = the equivalent subtransient impedance
$n$ = turns ratio of the current transformer In the secondary of current transformer 10, the voltage developed across equivalent subtransient impedance 13 is:

$$v_s = i_s z(p) \tag{1}$$

since $i_s = i/n$, $$v_s = \frac{i}{n} z(p) \quad (2)$$

The generator terminal voltage per phase is:

$$V_t = v - iZ(p) \quad (3)$$

Thus, the voltage generated by the air gap flux is:

$$v = V_t + iZ(p) \quad (4)$$

The reconstructed voltage per phase is:

$$v_o = V_t + v_s \quad (5)$$

or, substituting from (2):

$$v_o = V_t + \frac{i}{n} z(p) \quad (6)$$

If $z(p)$ is defined as:

$$z(p) = nZ(p) \quad (7)$$

Then, $$v_o = V_t + iZ(p) \quad (8)$$

or, substituting from Equation 3:

$$v_o = v \quad (9)$$

The circuitry illustrated in FIGURE 1 is developed by first ascertaining the subtransient impedance of the generator and thereafter constructing a network in the manner well known to the art which provides the same impedance characteristics in response to the operating range of frequency encountered. As shown in FIGURE 1, the addition of a voltage level equivalent to that which is instantaneously dropped across the subtransient impedance in each phase is accomplished by means of a current transformer 10, 11, or 12 which supplies current to an equivalent subtransient impedance 13, 14, or 15, respectively, and thereby creates a voltage equal to the dropped voltage in each phase. The output of the various subtransient impedances is a reconstructed waveform substantially identical to the originally generated air gap flux voltage.

In FIGURE 1, the line-to-line reconstructed voltage from the third phase to the second phase is applied via a transformer 16 to modulator 19 in order to furnish the waveform 26 that is essential in generating an appropriate triggering condition. Of course, the basic concepts taught herein are applicable in other arrangements wherein it is essential to recreate an instantaneously changing voltage emanating from a source having subtransient impedances associated therewith.

It will, of course, be understood that it is not wished to be limited to the particular embodiment shown herein since modifications may be made in both the circuit arrangement and the elements employed and it is contemplated in the appended claims to cover any such modifications as fall within the true spirit and scope of the invention.

What is claimed as new and desired to be secured by Letters Patent of the United States is:

1. A circuit for reconstructing the waveform of the voltage generated by the air gap flux of an alternator comprising, means for generating an instantaneous voltage equal to the voltage dropped across the subtransient impedance of said alternator, and means serially connecting said instantaneous voltage in additive relationship with the voltage at the terminals of said alternator.

2. A circuit for reconstructing the waveform of the voltage generated by the air gap flux of an alternator comprising, an impedance characterized by an instantaneous response to currents in the frequency range encompassed by the alternator output that substantially corresponds to the response of the internal impedance of said alternator, means for supplying current to said impedance that is proportional to the current delivered at the output of said alternator, and means connecting said impedance to one output terminal of said alternator whereby the voltage generated thereacross due to said supplied current is added to the voltage at said output terminal.

3. A circuit for reconstructing the waveform of the voltage generated by the air gap flux of an alternator comprising, an impedance network having substantially the same instantaneous response to current in the frequency range encompassed by the output of said alternator as that of the internal impedance of said alternator, a current transformer coupled to the output of said alternator and adapted to supply current to said impedance network having instantaneous characteristics corresponding to the load current supplied by said alternator, and means connecting said impedance network to the output of said alternator whereby the voltage generated thereacross is added to the voltage at said output.

4. A circuit for reconstructing the waveforms of the voltage generated by the air gap flux of a multiphase alternator comprising, an impedance for each phase characterized by an instantaneous response to current in the operating frequency range of the alternator that substantially corresponds to the response of the internal impedance of the associated phase of said alternator, means individual to each said impedance for supplying current thereto that is proportional to the current being supplied by the associated phase of said alternator, and means connecting each said impedance to the output of the associated phase of said alternator whereby the voltage generated thereacross is added to the voltage at said output.

5. In a frequency conversion system including an alternating current generator, a source of constant frequency voltage signals, a load, a frequency converter connected to the output of said alternating current generator and selectively operative to supply power from said generator to said load, and control means connected to said source of voltage signals and said generator for operating said frequency converter in response to the combined voltage magnitudes of said voltage signals and the output of said alternating current generator, the improvement comprising: means interposed in the connection between said alternating current generator and said control means for adding a voltage to the output thereof equivalent to the voltage drop in said generator due to the subtransient impedance therein.

6. The improvement defined by claim 5 wherein said interposed means comprises, an impedance characterized by an instantaneous response to currents in the operating frequency range of said generator that substantially corresponds to the response of the internal impedance of said generator, and means for supplying current to said impedance that is proportional to the current delivered at the output of said alternator.

7. The improvement defined by claim 5 wherein said interposed means comprises, an impedance network having substantially the same instantaneous response to currents in the operating frequency range of said generator as that of the internal impedance thereof, a current transformer coupled to the output of said generator and adapted to supply current to said impedance network having instantaneous characteristics corresponding to the load current supplied by said generator, and means connecting said impedance network between the output of said generator and said control means whereby the voltage applied to said control means is equal in magnitude to the sum of the generator output voltage and the voltage developed across said impedance network.

No references cited.

JOHN F. COUCH, *Primary Examiner.*

G. GOLDBERG, *Assistant Examiner.*